(12) United States Patent
Ritter et al.

(10) Patent No.: US 7,895,126 B1
(45) Date of Patent: Feb. 22, 2011

(54) METHOD, COMMUNICATIONS SYSTEM AND RECEIVER DEVICE FOR THE BILLING OF ACCESS CONTROLLED PROGRAMMES AND /OR DATA FROM BROADCAST TRANSMITTERS

(75) Inventors: Rudolf Ritter, Rossweidweg (CH); Claude Trinchan, Chemin de Bellevue (CH)

(73) Assignee: Kudelski S.A., Cheseaux-Sur Lausanne (CH)

( * ) Notice: Subject to any disclaimer, the term of this patent is extended or adjusted under 35 U.S.C. 154(b) by 0 days.

(21) Appl. No.: 10/221,136

(22) PCT Filed: Mar. 10, 2000

(86) PCT No.: PCT/CH00/00142

§ 371 (c)(1),
(2), (4) Date: Sep. 10, 2002

(87) PCT Pub. No.: WO01/67761

PCT Pub. Date: Sep. 13, 2001

(51) Int. Cl.
*G06F 17/60* (2006.01)
*H04N 7/14* (2006.01)
(52) U.S. Cl. .................. 705/67; 715/716; 725/105
(58) Field of Classification Search ............... 380/239, 380/279; 370/313; 455/556.2; 705/1, 40, 705/50

See application file for complete search history.

(56) References Cited

U.S. PATENT DOCUMENTS

| | | | |
|---|---|---|---|
| 4,710,955 A | | 12/1987 | Kauffman |
| 5,577,100 A | * | 11/1996 | McGregor et al. .......... 455/406 |
| 5,619,247 A | | 4/1997 | Russo |
| 5,812,930 A | * | 9/1998 | Zavrel .......................... 725/62 |
| 5,878,135 A | * | 3/1999 | Blatter et al. ................ 380/239 |
| 5,887,266 A | * | 3/1999 | Heinonen et al. ............ 455/558 |
| 5,914,941 A | * | 6/1999 | Janky .......................... 370/313 |
| 5,978,456 A | * | 11/1999 | Takeuchi et al. ............. 379/131 |
| 6,009,096 A | * | 12/1999 | Jaisingh et al. ........... 370/310.1 |
| 6,016,348 A | * | 1/2000 | Blatter et al. ................ 380/239 |
| 6,172,673 B1 | * | 1/2001 | Lehtinen et al. ............. 715/716 |

(Continued)

FOREIGN PATENT DOCUMENTS

DE        198 46 452 A        12/1999

(Continued)

OTHER PUBLICATIONS

Patent Abstract of Japan, vol. 010, No. 289, Oct. 2, 1986.

*Primary Examiner*—Evens J Augustin
(74) *Attorney, Agent, or Firm*—Harness, Dickey & Pierce, P.L.C.

(57) ABSTRACT

A method, a communications system and a receiving device are for billing of access-controlled programs and/or data which are broadcast by a broadcast transmitter unidirectionally and encrypted, and are received by at least one receiving device. A monetary value is stored in a data memory of the receiving device. The costs for access to the access-controlled programs and/or data are determined in the receiving device based on received cost data, and decryption of the access-controlled programs and/or data in the receiving device is prevented if the determined costs are greater than the stored monetary value. Billing records are generated in the receiving device for the allocation of credit items to the vendors of the access-controlled programs and/or data, and are transmitted to a billing center via various data channels.

23 Claims, 1 Drawing Sheet

U.S. PATENT DOCUMENTS

Figure 1:
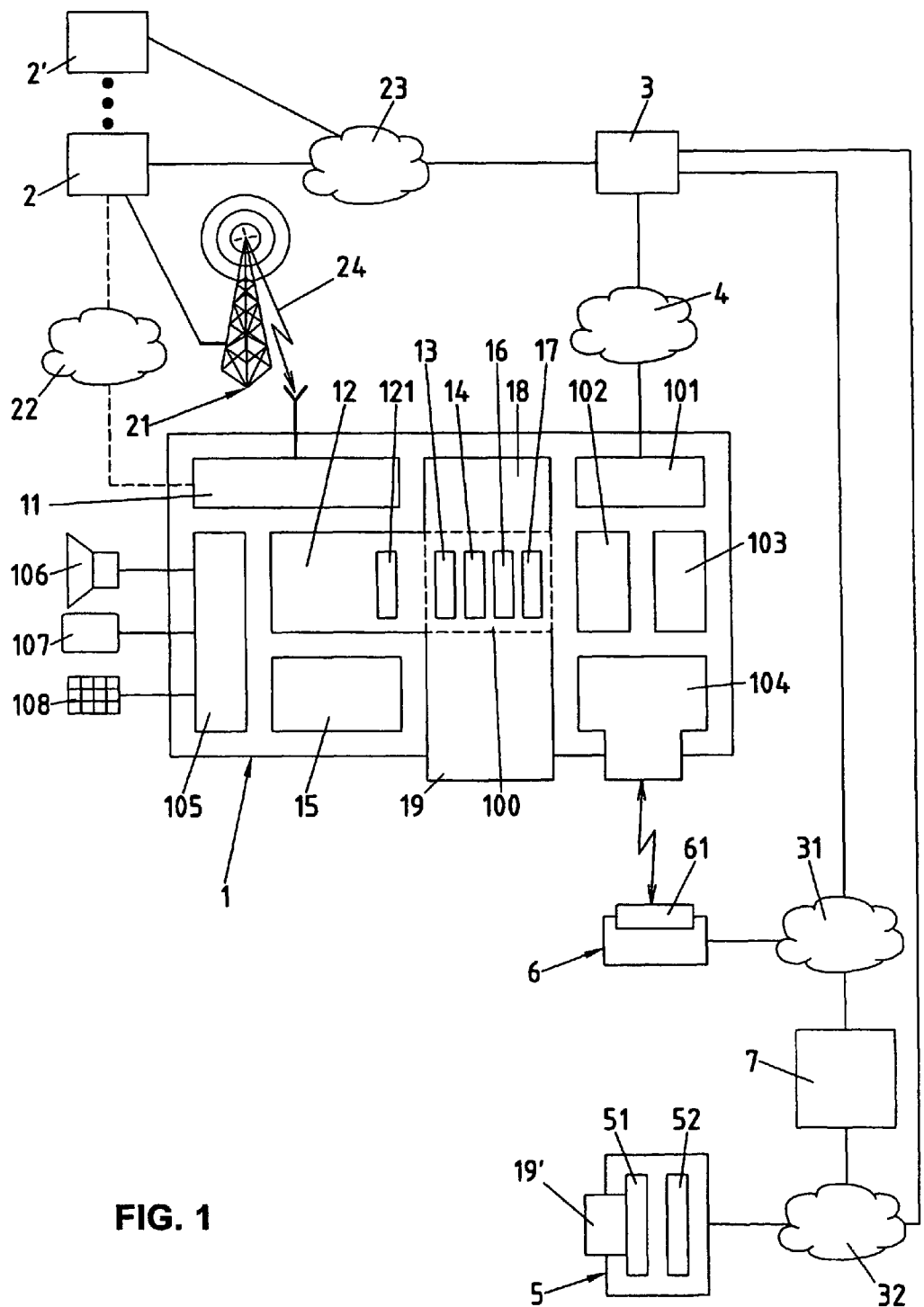

| | | | |
|---|---|---|---|
| 6,298,373 B1* | 10/2001 | Burns et al. | 709/203 |
| 6,434,403 B1* | 8/2002 | Ausems et al. | 455/556.2 |
| 6,671,509 B1* | 12/2003 | Tanaka et al. | 455/419 |
| 6,925,489 B1* | 8/2005 | Curtin | 709/217 |
| 6,993,137 B2* | 1/2006 | Fransdonk | 380/279 |
| 7,340,055 B2* | 3/2008 | Hori et al. | 380/201 |
| 7,565,671 B1* | 7/2009 | Ritter et al. | 725/10 |
| 2001/0005840 A1* | 6/2001 | Verkama | 705/67 |
| 2004/0097220 A1* | 5/2004 | McGregor et al. | 455/419 |
| 2005/0094638 A1* | 5/2005 | Holm et al. | 370/389 |

FOREIGN PATENT DOCUMENTS

| | | |
|---|---|---|
| EP | 0 128 555 A | 12/1984 |
| EP | 0 314 203 A | 5/1989 |
| EP | 0 789 337 A | 8/1997 |

\* cited by examiner

METHOD, COMMUNICATIONS SYSTEM AND RECEIVER DEVICE FOR THE BILLING OF ACCESS CONTROLLED PROGRAMMES AND /OR DATA FROM BROADCAST TRANSMITTERS

This invention relates to a method, a communications system and a receiving device for the billing of access-controlled programs and/or data, which are encrypted and broadcast unidirectionally by a broadcast transmitter. In particular, this invention relates to a method, a communications system and a receiving device for the billing of access-controlled programs and/or data according to the respective preambles of the independent claims 1, 7 and 13.

Worldwide at the present time broadcast systems with broadcast transmitters and broadcast receivers are being built in which digital audio, or respectively video, programs (television programs), and digital data, for example data for the execution of data services or program-accompanying data relating to the respective programs (Program Associated Data, PAD) are broadcast unidirectionally by the broadcast transmitters, for instance by means of radio waves emitted by terrestrial or satellite-based transmitters, or via broadcast cable networks, and are received by corresponding broadcast receivers. Such broadcast systems are known, for example, by the designation Digital Audio Broadcasting (DAB), or respectively Digital Video Broadcasting (DVB). In particular, access-controlled programs and/or data can also be broadcast by means of these broadcast systems. Access-controlled programs and/or data are broadcast encrypted (scrambled), and can be received and decrypted (descrambled) by means of broadcast receivers by authorized users only. The unidirectional broadcasting feature of these broadcast systems has the drawback, however, that a backward channel is lacking from the broadcast receivers to the broadcast transmitters, or respectively to their operators, in particular with transmission by means of radio waves. Owing to this lacking backward channel, the possibilities for billing of access-controlled programs and/or data is limited. Access-controlled programs and/or data in these broadcast systems are generally billed in that subscriptions for various programs and/or data services are made out to interested users by the vendors, for example the operators of the broadcast transmitters, in exchange for subscription fees, for instance subscriptions to specific themes or programs, which can be purchased for a subscription period. Corresponding to the subscription, paid in advance or subsequently paid, authorization data for the subscribed-to services are loaded for the respective user in the broadcast receiver, for example through direct addressing via the broadcast channel or by means of a data carrier. This type of billing by subscription is particularly disadvantageous for the users when they would like to purchase access-controlled programs and/or data from several vendors, or respectively from several broadcast transmitters, since they have to take out subscriptions with several vendors. Billing by subscription is also disadvantageous for the users because they are not able to purchase spontaneously access-controlled programs and/or data for which they have not taken out any subscription. A further drawback of billing by subscription is that the vendors, or respectively the operators of the broadcast transmitters, receive no direct information about which subscribed-to services are actually availed of by the user. From the viewpoint of the users, billing by subscription moreover does not seem to be a fair billing method since they have to pay for subscriptions regardless of whether they have used the subscribed-to services or not. In particular for operators of smaller broadcast transmitters, or respectively smaller vendors of access-controlled programs and/or data, the expense for administration of such subscriptions and for billing such services is too costly.

In the Patent application EP 314203 A2, a system is described which concern the encryption of television signals based on a pay-TV subscription. According to this document, the end device (set to box) comprises an authorization processor, which comprises a credit register, for which the received credit signal value is stored. According to EP 314203 A2, a debt register is updated according to the cost of the received programs over the network for a corresponding subscription. According to EP 314203 A2, the comparison unit compares the updated cost and the credit, in order to determine if the current subscription allow the decryption of the encrypted television signals. According to D1, the amount of the current cost is sent to the provider through the television network.

It is an object of the present invention to propose a new and better method, a new and better communications system as well as a new and better receiving device which are suitable for the billing of access-controlled programs and/or services, broadcast encrypted and unidirectionally by a broadcast transmitter, and which in particular do not have the above-mentioned drawbacks.

According to the present invention, these objects are achieved in particular through the elements of the independent claims. Further preferred embodiments follow moreover from the dependent claims and from the description.

In particular, these objects are achieved by means of the invention in that for the billing of access-controlled programs and/or data, which are broadcast encrypted and unidirectionally by a broadcast transmitter, a monetary value is stored in a data memory of the receiving device, costs for access to the access-controlled programs and/or data are determined in the mobile receiving device based on received cost data for the access-controlled programs and/or data, the decryption of the access-controlled programs and/or data in the mobile receiving device is prevented if the determined costs are greater than the stored monetary value, and the costs for access to the unencrypted access-controlled programs and/or data are deducted from the stored monetary value, and billing records are generated in the mobile receiving device and stored in a data memory of the receiving device, which billing records comprise the cost amounts and/or cost parameters for calculation of the cost amounts for the access to the unencrypted access-controlled programs and/or data as well as an identification of the vendor of these access-controlled programs and/or data, the generated billing records are transmitted to the billing center (3) via a mobile radio network (4), and the billing center (3) credits credit items to the respective vendors in accordance with the received billing records. Depending upon the embodiment variant, the monetary amount can be a prepaid monetary amount, or it can represent a credit limit, which may not be exceeded. The programs comprise, for example, digital audio and/or video programs. The billing record parameters are for example Start and End time, or time length as well as the cost of time per unit of the received program and/or data. The telecommunication network is for example a GSM (Global System for Mobile Telecommunication) or UMTS network (Universal Mobile telephone System) or other such as satellite based mobile network.

The advantage of this stored monetary value and the continuous deduction from this monetary value of the costs for access to the access-controlled programs and/or data is that a user can purchase spontaneously access-controlled programs and/or data without having to have taken out a subscription beforehand, the purchase of access-controlled programs and/ or data continuing to be limited, however, by the prepaid monetary amount, or respectively by the credit limit represented by the monetary value.

The advantage of the generation and storing of billing records is that subsequent bookkeeping and billing of the costs for access to the access-controlled programs and or data is thereby made possible.

The advantage of the transmission of the billing records to a billing center and the assignment by this billing center of credit items to the vendors in accordance with data in the billing records is that spontaneous purchase of access-controlled programs and/or data from a plurality of vendors, or respectively different broadcast transmitters, is thereby made possible, without subscriptions therefore having to be taken out by the users with all these vendors. Based on the transmitted billing records, information about the programs and/or data actually taken by the users can moreover be made available to the vendors. Furthermore the billing via a billing center means a considerable relief for the vendors, or respectively for the operators of the broadcast transmitters, since they do not have to preoccupy themselves with either the administration of subscriptions or with itemized billing of the costs.

The advantage of the transmission of the billing records to a billing center through a mobile communication network is that, the transmission of the billing records to the billing center, and the subsequent crediting of amounts to the various vendors based on these billing records, can be carried out without data carriers, in particular chip cards, having to be removed by the users from the receiving devices and inserted in a data terminal. The transmission of the billing records to the billing center can be carried out automatically in this embodiment variant without initiative or assistance from the users.

Electronically signed billing records are preferably generated in the receiving device.

In one embodiment variant, the monetary value and/or the billing records are stored in a data memory, which is integrated in a chip card that is removable from the receiving device. The advantage of storing the monetary value and/or the billing records in a data memory removable from the receiving device is that, on the one hand, these data can be made accessible to external data processing means outside the receiving device, without the aid of additional communications means in the receiving device, and, on the other hand, that several users can use the same receiving device in a user-specific way in that they insert their own data memory into the receiving device, or in that a user can insert different data carriers for various purposes into the receiving device, e.g. for private or business use or for different themes.

In one embodiment variant, the chip card is removed from the receiving device and is inserted into an external data terminal outside the receiving device, the generated billing records being read by the data terminal and transmitted to the billing center, and the monetary value being reloaded or loaded with a reload amount by the data terminal. The reload amount corresponds, for example, to a prepaid monetary amount determined by the user, which is debited to the user on a bank account, for instance, or a credit card account (credit card number), or which is paid by the user in cash at the data terminal. The advantage of this embodiment variant is that it can be achieved on the basis of numerous, already existing, linked data terminals, e.g. automatic banking machines or ticket machines.

In an other embodiment is the billing amount is updated or loaded through the mobile telecommunication network.

In an embodiment variant, the generated billing records are transmitted by the receiving device via an interface, for example a contact less device interface, e.g. an infrared interface or a radio interface, to an external data terminal outside the receiving device, the generated billing records being transmitted by the data terminal via a communications network to the billing center, a reload amount being received by the receiving device from the data terminal via the interface, and the monetary value being reloaded or loaded with the received reload amount.

One embodiment of the present invention will be described in the following with reference to an example. The example of the embodiment is illustrated by the single attached FIG. 1, which, shows a schematic block diagram of a communications system in which a broadcast transmitter, a receiving device as well as data terminals linked to a billing center are illustrated.

In FIG. 1, the reference numerals 2 and 2' refer in each case to a broadcast transmitter which broadcasts programs and/or data unidirectionally, for example by means of radio waves from a terrestrial or satellite-based broadcast transmission antenna 21 via an air interface 24, or via broadcast cable networks 22. Designated by the reference numerals 2 and 2' are also the vendors of these programs and/or data, e.g. digital audio, or respectively video, programs (television programs), and digital data, for example data for the execution of data services or program-accompanying data relating to the respective programs (Program Associated Data, PAD). For better clarity it should be mentioned here, however, that several different vendors can also broadcast their programs and/or data over a common broadcast transmitter 2, 2'.

The reference numeral 1 refers to a receiving device with a broadcast receiver 11, by means of which the programs and/or data broadcast by the broadcast transmitters 2, 2' can be received over broadcast channels, for example over a broadcast cable network 22 or by means of a receiving antenna as radio waves via an air interface 24.

Broadcast systems with such broadcast transmitters and broadcast receivers are known, for example, by the designation Digital Audio Broadcasting (DAB), or respectively Digital Video Broadcasting (DVB).

The standard ETS 300 401, "Radio broadcasting systems; Digital Audio Broadcasting (DAB) to mobile, portable and fixed receivers" was defined by the European Telecommunications Standards Institute (ETSI), F-06921 Sophia Antipolis Cedex, France, for the Digital Audio Broadcasting (DAB) system, which was developed for the transmission of high quality digital audio programs and/or data services for reception by means of mobile, portable and fixed, installed terminals from terrestrial or satellite-based transmitters 2, 2', or from broadcast cable networks 22. The content of this document ETS 300 401 relating thereto, which was published by the ETSI in the second edition in May 1997, as well as the content of the standard document ETS 300 174 "Network Aspects (NA); Digital coding of component television signals for contribution quality applications in the range 34-45 Mbits/s," which was published in November 1992 by the ETSI, are hereby incorporated in this text by reference.

Also defined in the above-mentioned ETSI standards is a Fast Information Channel (FIC) by means of which a quicker access to information is made possible for the broadcast receivers 11. Multiplex Configuration Information (MCI), for example, and also service information and data for data services are transmitted over the FIC channel.

In order to limit the access to individual services or a plurality of services or service components to authorized users (in connection with DAB these services and service components are audio programs and/or data (services) in connection with DVB video, or respectively television programs, and/or data (services)), mechanisms are defined in the above-mentioned ETSI standards for access-controlled programs and/or data (services), the so-called conditional access. Described in particular in the above-mentioned ETSI standards are scrambling/descrambling procedures (encryption/decryption), parameters for the signaling and synchronization of the conditional access as well as mechanisms for the control and distribution of authorizations (authorization data for users) through the transmission of so-called ECM messages (Entitlement Checking Messages) and EMM messages (Entitlement Management Messages) over broadcast channels (broadcast cable network 22 or air interface 24).

According to the above-mentioned ETSI standards, a conditional access flag and/or conditional access identifier is used for each of the service components transmitted over the broadcast channels 22, 24 in order to indicate to the broadcast receiver 11 whether the respective service component uses conditional access mechanisms or not, and, if applicable, which type of mechanisms are used. For service components, which are in a controlled access mode and which are designated in this text as access-controlled programs and/or data, the data of the respective service component (which component can relate to the programs and/or data) are encrypted with a control word, this control word being changed regularly, and for its part being transmitted to the broadcast receivers 11 encrypted through a session key (key) in the ECM messages.

Identified by the conditional access identifier, according to the above-mentioned ETSI standards, is the access control module 12, the so-called access control system, used for all service components of a service, which access control system can interpret and process the ECM and EMM messages transmitted by the broadcast transmitter 2, 2'.

The session key (key) used for encryption of the control words is stored as secret information in the access control system, according to the above-mentioned ETSI standards. Session keys (keys) can be transmitted to the broadcast receivers 11 in EMM messages, whereby, for the transmission, they are encrypted themselves by a distribution key.

According to the above-mentioned ETSI standards, authorizations (authorization data) are transmitted to the broadcast receivers 11 in the EMM messages, different kinds of authorizations being defined which correspond to different types of subscriptions: subscriptions for a theme, a level or a class, reservation in advance with payment per program, or spontaneous payment per program, per service or per time unit. According to the above-mentioned ETSI standards, the EMM messages can be transmitted to a specific customer (user) identified through an unambiguous address, to a small group of customers (users) identified by a group address, to a large group of customers (users) identified by a collective address, or to all customers. Since the content of the EMM messages, in particular the authorizations, does not have to be transmitted to the broadcast receivers 11 in real time, this content can be transmitted to the broadcast receivers 11 in another way, for example stored on a data carrier, in particular a chip card 19, instead of by means of EMM messages.

According to the above-mentioned ETSI standards, the customer addresses are stored in the access control system (access control module 12), and are transmitted by the access control system to the EMM receiving module (not shown), responsible for receiving EMM messages, of the broadcast receiver 11, so that this EMM receiving module passes on only those EMM messages to the access control system which contain a customer address that coincides with one of the customer addresses received from the access control system.

So as not to overburden the access control system unnecessarily with messages, the broadcast receiver 11 comprises hardware or software filters, which pass on to the access control system only those messages which can and have to be interpreted and processed by the access control system; for example, messages, as mentioned above, are filtered on the basis of customer address and repeatedly transmitted messages are filtered.

According to the above-mentioned ETSI standards, in addition to secret codes for the decryption (descrambling), the conditions (access conditions data) are transmitted to the broadcast receivers 11 in the ECM messages, which conditions are to be fulfilled in order to obtain access to conditional access services. The ECM messages contain all information specifying the conditions for access to a service, e.g. an audio program or a data service. Customers with differing authorizations can therefore access a service. According to the above-mentioned ETSI standards, depending upon available service access, the following parameters can be contained in the ECM messages:

Program provider identifier, identifies the vendor who has generated the ECM message.

Broadcast date and program theme/level, if the program, that means the service, is available in the subscription for a theme/level.

Broadcast date and program class, if the program, that means the service, is available in the subscription per link.

Program number, if the program, that means the service, is available with pre-reservation and payment per program.

Program number and program costs, if the program, that means the service, is available for spontaneous payment per program.

Program number and costs per time unit of the program, if the program, that means the service, is available for spontaneous payment per time unit per program.

If the authorizations meet the conditions, which are to be fulfilled to obtain access to conditional access services, the session key (key) of the access control system can be used to decrypt the control word. Then the data of the respective service components can be decrypted with the control word.

According to the present invention, a monetary value is stored in a data memory 16, which cannot be written in by the user, of the receiving device 1, which monetary value corresponds to a prepaid monetary amount or a credit limit. The data memory 16 is installed in the receiving device 1 in a fixed way, or it is located on a data carrier of the receiving device 1, for example a chip card 19, which data carrier can be removed from the receiving device 1 by the user. The monetary value is loaded into the data memory 16, for example via the broadcast channels 22, 24 or over a communications network 4, for instance a mobile radio network, e.g. a GSM or UMTS network or another—e.g. satellite-based—mobile radio network, or a fixed network, for instance an ISDN network, the public switched telephone network, or an IP network (in particular the Internet). If the memory 16 is located on a chip card 19, the monetary amount can be loaded by means of a card reading/writing device 51 into which the chip card 19 is inserted.

As mentioned above, cost data can also be transmitted by the broadcast transmitter 2, 2' to the broadcast receivers 11 in the ECM messages, namely program costs for access-controlled programs and/or data, which are available for spontaneous payment per service, and/or costs per time unit for access-controlled programs and/or data which are available for spontaneous payment per time unit and per service. The costs recording module 18 calculates the costs based on these cost data, which are to be paid for the access to the respective access-controlled programs and/or data. The costs recording module 18 is, for example, a programmed software module that is implemented on a processor or in hardware.

As illustrated diagrammatically in FIG. 1, the access control module 12 (access control system) is provided with a supplementary credit control module 121. The credit control module 121 prevents the decryption of access-controlled programs and/or data if the costs to be paid, calculated by the costs recording module 18, are greater than the monetary value stored in the data memory 16. The comparison operation with respect to the calculated costs and the stored monetary value can thereby be carried out by the credit control module 121, or, to lessen the burden upon the access control module 12, it can be carried out outside the credit control module 121, for example in hardware, so that the credit control module 121 can be reduced to the function of checking the results of the comparison operation, for example. Functions and operations of the access control module 12 can be carried out, for example, in parallel (simultaneously) with the functions and operations of the costs recording module 18. For example, the costs recording module 18 can determine the costs for the access to the respective access-controlled programs and/or data on the basis of the cost data received in the ECM messages, and store the result of the comparison operation (for instance, "1" for sufficient credit, "0" for insufficient credit) in a memory location accessible to the access control module 12, while the access control module 12 determines the authorization of the user for access to the respective access-controlled programs and/or data on the basis of the access conditions data received in the ECM messages and the authorization data 14 stored in the receiving device 1, and afterwards, with existing authorization, checks the result of the comparison operation determined by the costs recording module 18. If it was determined through the comparison operation that the credit of the user is sufficient, the key 13 (session key) stored in the receiving device 1 is released by the access control module 12 for the decryption of the control word received in the ECM messages, and the decryption of the encrypted access-controlled programs and/or data by the decryption module 15 is thereby made possible. If it was determined through the comparison operation that the credit of the user is not sufficient, the key 13 (session key) stored in the receiving device 1 is not released by the access control module 12 for the decryption of the control word received in the ECM messages, and the decryption of the encrypted access-controlled programs and/or data by the decryption module 15 is thereby prevented.

To support various access control modules 12 with or without supplementary credit control module 121, various conditional access identifiers can be defined and used, for example.

In a variant, the credit control can be carried out in such a way that credit condition values, specifying a minimum monetary value for access to access-controlled programs and/or data, are transmitted as access conditions data to the receiving device 1 in the ECM messages, an authorization amount value, corresponding to a prepaid monetary amount or a credit limit, is stored in the receiving device 1 as part of the authorization data, and the credit control module 121 compares received credit condition values with stored authorization amount values before the access to the key (session key) is released for decryption of the access-controlled programs and/or data.

As a further function of the costs recording module 18, the costs for successful access to the unencrypted access-controlled programs and/or data are deducted from the monetary amount stored in the memory 16. In addition, billing records are generated by the costs recording module 18, are signed electronically for authentication purposes, and are stored in a stack 17 in the receiving device 1. The electronic signature verifies, for example, the costs recording module 18 and/or the receiving device 1 and/or the respective user of the receiving device 1 as authentic producer/source of the billing records. The electronic signature is based, for example, on a certificate issued by a certifying unit, for instance a Trusted Third Party (TTP). The billing records contain the cost amounts and/or the cost parameters for calculation of the cost amounts for access to the unencrypted access-controlled programs and/or data. The cost parameters are, e.g., starting and ending time or duration as well as the costs per time unit of the programs and/or data purchased. The billing records can also contain information about respective access-controlled programs and/or data, e.g. program number, indications about the program theme, the program level and/or the program class and/or a currency indication. In connection with the currency indication, it should also be mentioned moreover that not only can various currencies be supported for the monetary values, but points according to a defined point system can also be used and supported for the monetary values, e.g. a loyalty point system, these points being treated like a currency. The billing records contain in addition an indication of the vendor and/or of the broadcast transmitter of the respective access-controlled programs and/or data. The billing records also contain, in a variant, an identification of the user of the receiving device 1, which user identification corresponds, for instance, to the above-mentioned unambiguous customer address or which user identification corresponds to another user identification for another system, for instance an International Mobile Subscriber Identity (IMSI), which serves for identification in a mobile radio network, and which user identification is stored, for example, in a chip card, e.g. an SIM card (Subscriber Identification Module).

As will be described later, the generated billing records can be transmitted over various data channels, for example directly over a communications network 4, via an interface 104-61, to a data terminal 6, and from the data terminal 6 over a communications network 31, or by means of a chip card 19', inserted into a data terminal 5, via this data terminal 5 and a communications network 32 to a billing center 3.

Disposed in an overlapping area 100, indicated by a rectangle drawn in broken lines in FIG. 1, are various data elements, or respectively the memory and memory locations intended therefore, namely the session key 13 (key), the authorization data 14, the monetary value in the memory 16 and the stack 17 with the billing records. Indicated by this diagrammatic overlapping area 100 should be that, in different embodiment variants of the access control module 12 and/or of the costs recording module 18, the data elements disposed therein, or respectively the memory and memory locations provided therefore, are implemented fixed in the receiving device 1 and/or on the chip card 19, which can be removed from the receiving device 1. The advantage of storing these data elements 13, 14, 16, 17 on the chip card 19 of the receiving device 1 are in particular that, through removal of the chip card 19 from the receiving device 1, the receiving device 1 can be blocked with respect to access by unauthorized users to access-controlled programs and/or data. Moreover a user can remove the chip card 19 from a first receiving device 1, which is implemented, for example, as a mobile (and possibly portable) receiving device 1, and insert it in a second receiving device 1, which is implemented, for instance, as a fixed, installed receiving device 1. It should also be mentioned here that the costs recording module 18 and/or the access control module 12 can also be implemented on the chip card 19, whereby one skilled in the art understands that the real-time requirements relating thereto for the access control module 12 have to be taken into consideration. The distribution of executable functions and to-be-stored data elements among fixed, installed memories and processors in the receiving device 1, or respectively memories and processors of the chip card 19, removable from the receiving device 1, can be carried out, for example, taking into consideration the specifications of the Mobile Application Execution Environment (MexE, GSM 02.57 and GSM 03.57). By means of suitable synchronization mechanisms, data elements can be stored on the chip card 19, and copied into fixed, installed memory locations in the receiving device 1, where they are available for real-time operations, upon insertion each time of the chip card 19 into the receiving device 1. Changed values of the data elements stored in the fixed, installed memory locations can be updated on the chip card 19, for example, through a parallel process. One skilled in the art will understand that in particular confidential data exchanged between processes that are distributed among a plurality of processors are transmitted in a protected way in each case for security reasons.

The unencrypted programs, or respectively data, can be reproduced for the user of the receiving device 1, for instance via a processing module 105, and from there via electroacoustical converters 106, or respectively display units 107. Before reproduction for the user, entailing costs, a corresponding confirmation can be optionally requested from the user by the receiving device 1 (for instance an option that can be configured by the user), for example through a corresponding software module, via a display unit 107, for instance giving the costs for the access to the respective access-controlled programs and/or data, and the confirmation can be given by the user via the input elements 108.

As shown diagrammatically in FIG. 1, the receiving device 1 further comprises, in an embodiment variant, a communications module 101, or can be connected to a communications module via a device interface. By means of the communications module 101, data can be exchanged over the communications network 4 with external communications units outside the receiving device 1. The communications network 4 is, for example, a mobile radio network, e.g. a GSM or UMTS network, or another—e.g. satellite-based—mobile radio network, or a fixed network, for instance an ISDN network, the public switched telephone network, a TV or radio cable network, or an IP network (Internet Protocol). In particular in receiving devices 1 designed as mobile devices, the communications module 101 comprises a mobile radio module for communication via the mobile radio network 4. By means of the communications module 101, the above-mentioned billing records in particular can be transmitted to the billing center 3, e.g. periodically or in each case upon reaching a predefined value for the monetary amount in the memory 16. Furthermore a reload amount can be accepted over the communications network 4 by means of the communications module 101, for example directly from the billing center 3, for instance together with the confirmation of receipt of the billing records in each case, or from a financial institution, it being possible, for instance, to also check the solvency of the respective user beforehand.

The monetary value stored in the memory 16 is reloaded or loaded with the received reload amount by the reload module 102 of the receiving device 1. The reload module 102 is, for example, a programmed software module, which is implemented on a fixed, installed processor of the receiving device 1 or on a processor of the chip card 19 of the receiving device 1, or is a module achieved in hardware.

It should be mentioned here that, in a variant in which the receiving device 1 with the communications module 101 has a backward channel, the billing records can be transmitted in a way similar to CDR records (Call Data Records) as so-called DUR records (DAB/DVB Usage Records) to a billing or clearing system, for example in the billing center 3, and that the above-described credit controls, by means of the stored monetary value and the deduction of costs to be paid from this monetary value, are not absolutely necessary. In other words, if the receiving device 1 is provided with the communications module 101, the billing of costs can take place, in a variant, through transmission of the billing records by means of the communications module 101 to a billing or clearing system, without monetary values having to be stored, checked or debited in the receiving device 1.

In a further embodiment variant, the receiving device 1 comprises an interface 104, in particular a device interface, for instance a contact less interface, e.g. an infrared interface, for example a High Speed Infrared (HSIR) interface or an IrDA (Infrared Data Association) interface, an inductive interface, for example a Radio Frequency Identification (RFID) interface, a Home RF (Radio Frequency) interface, a Digital European Cordless Telecommunications (DECT) interface or another Cordless Telecommunications System (CTS) interface, or a high frequency radio interface, for example a so-called "Bluetooth Interface." Via this interface 104, the receiving device 1 can exchange data with external data terminals 6 outside the receiving device 1, which have a corresponding interface 61. In particular, the above-mentioned billing records can be transmitted by the billing module 103 via the interface 104-61 to the data terminal 6, and sent by the data terminal 6 via a communications network 31 to the billing center 3. Moreover a reload amount can be received via the interface 104-61, for example together with the confirmation of receipt of the billing records in each case, e.g. directly from the billing center 3 or from an account administration unit 7 of a financial institution, it being possible, for instance, to also check the solvency of the respective user beforehand. As mentioned above, the monetary amount stored in the memory 16 can be reloaded or loaded with the received reload amount by the reload module 102. The billing module 103 is, for example, a programmed software module, which is implemented on a processor of the receiving device 1 or of the chip card 19, or is a module achieved in hardware.

If the billing records are stored on the chip card 19, they can be read by an external data terminal 5 outside the receiving device 1 by inserting the chip card 19 into the card reading/writing device 51 of the data terminal 5, as indicated in the FIGURE by the chip card 19'. The billing records can then be sent by the data terminal to the billing center 3 via a communications network 32. If the memory 16 for storing the monetary amount is integrated on the chip card 19, the monetary value can moreover be reloaded or loaded with a reload amount by the reload module 52 of the data terminal 5, for example directly from the billing center 3 or from the account administration unit 7 of a financial institution, for instance together with the confirmation of receipt of the billing records in each case, it being possible, for instance, to also check the solvency of the respective user beforehand. After confirmation of receipt of the billing records, the billing records stored in the receiving device 1 and/or on the chip card 19 can be marked as billed. The reload module 52 can be implemented as a software or hardware module.

The data terminal 6, or respectively the data terminal 5, is preferably a data terminal accessible to the public, e.g. an automatic banking machine, a ticket machine or a point of sale device.

The billing records are received in the billing center 3 via the communications networks 4, 31 and 32, and the authenticity of the sender, respectively of the producer or the source of the billing records, e.g. the authenticity of the costs recording module 18 that has generated the billing records, is checked on the basis of the electronic signature on the billing records. For authentic billing records, credit items, based on the cost indications contained therein, are credited to the respective vendors identified by the vendor identifications contained in the billing records. Information concerning the received billing records and/or statistical information relating to the access to access-controlled programs and/or data can be transmitted to the vendors by the billing center 3 over the communications network 23. If the above-mentioned reload amounts are issued in each case directly by the billing center 3 and/or if reload amounts, issued by financial institutions, are communicated in each case to the billing center 3 and are debited, the total sum of all the issued reload amounts and monetary values, or of those issued in a specific time period, e.g. one month, can be determined in the billing center 3. If it is noted in the billing center 3 that the monetary values and reload amounts issued, or respectively administrated, by the billing center have not been billed within a predefined time period, e.g. one or more years, through billing records received over the communications networks 4, 31 and 32, these monetary values and reload amounts can be allocated to the vendors by the billing center 3 based on statistical information relating to the access to access-controlled programs and/or data.

The billing center 3 comprises, for example, one or more communications servers as well as a database for storing the issued monetary values and reload amounts, for storing the received billing records, and for storing information relating to the vendors, or respectively operators of broadcast transmitters 2, 2'.

The present invention is suitable for achieving prepaid or post-paid variants of the billing for access-controlled programs and/or data, broadcast by broadcast transmitters 2, 2'. Monetary values, or respectively reload amounts, which are not paid in advance, serve merely as credit limits, so that the actual costs for the access to unencrypted access-controlled programs and/or data can be debited or invoiced to the respective user, identified by a user identification contained in the billing records, only after the transmission of the billing records to the billing center 3 or to another billing system. Prepaid monetary values, or respectively reload amounts, can be issued, for example, in the form of anonymous prepaid cards, which can be inserted into one of possibly several card insertion locations of the receiving device 1, in exchange for direct payment (cash, credit card) or corresponding debiting of an account. Prepaid or invoiced monetary values or reload amounts can be loaded, as described above, in the receiving device 1 for an identified user and debited from an account or invoiced, for example after completed solvency check.

List of Reference Numerals

| | |
|---|---|
| 1 | receiving device |
| 2, 2' | broadcast transmitter (vendor) |
| 3 | billing center |
| 4 | communications network (mobile radio network) |

-continued

List of Reference Numerals

| | |
|---|---|
| 5, 6 | data terminal |
| 7 | account administration unit |
| 11 | broadcast receiver |
| 12 | access control module |
| 13 | key |
| 14 | authorization data |
| 15 | decryption module |
| 16 | data memory with monetary value/amount |
| 17 | stack with billing records |
| 18 | costs recording module |
| 19, 19' | chip cards |
| 21 | broadcast transmission antenna |
| 22 | broadcast cable network |
| 23 | communications network |
| 24 | air interface |
| 31 | communications network |
| 32 | communications network |
| 51 | card reading/writing device |
| 52 | reload module |
| 61 | interface |
| 100 | overlapping area |
| 101 | communications module |
| 102 | reload module |
| 103 | billing module |
| 104 | interface |
| 105 | processing module |
| 106 | electro-acoustical converter |
| 107 | display unit |
| 108 | input elements |
| 121 | credit control module |

The invention claimed is:

1. A method for selective billing of at least one of a plurality of access-controlled programs and data which are encrypted and broadcast unidirectionally by a broadcast transmitter via a broadcasting network, comprising:

receiving at least one of a plurality of purchased encrypted and unidirectionally broadcast access-controlled programs and data, by a mobile receiving device, via the broadcasting network using a first channel, at least one of the plurality of access-controlled programs and data being decrypted in the mobile receiving device for access to at least one the plurality of access-controlled programs and data by a user of the mobile receiving device upon received access conditions data for at least one of the plurality of access-controlled programs and data coinciding with authorization data stored in the mobile receiving device;

storing, in the mobile receiving device, a monetary value in a data memory of the mobile receiving device;

determining, in the mobile receiving device, costs for access to a selected one of the plurality of access-controlled programs and data in the mobile receiving device based on received cost data for the selected one of the plurality of access-controlled programs and data;

preventing, in the mobile receiving device, access to the selected one of the plurality of access-controlled programs and data in the mobile receiving device upon the determined costs being greater than the stored monetary value;

deducting, in the mobile receiving device, the costs for access to the selected one of the plurality of access-controlled programs and data from the stored monetary value;

generating billing records in the mobile receiving device and storing the billing records in a data memory of the mobile receiving device, wherein billing records include at least one of the cost amounts and cost parameters for calculation of the cost amounts for the access to the selected one of the plurality of access-controlled programs and data and an identification of the vendor of the selected one of the plurality of access-controlled programs and data; and transmitting the generated billing records, by the mobile receiving device via a mobile radio network using a second channel, to a billing center, which credits credit items to a vendor of the selected one of the plurality of access-controlled programs and data.

2. The method according to the claim 1, wherein at least one of the monetary value and the billing records are stored in a data memory that is integrated into a chip card which is removable from the mobile receiving device.

3. The method according to the claim 2, wherein the chip card is removed from the mobile receiving device and inserted in an external data terminal outside the mobile receiving device, and said monetary value is at least one of reloaded and loaded with a reload amount by the data terminal.

4. The method according to the claim 1, wherein said monetary value is at least one of reloaded and loaded with the reload amount via the mobile radio network.

5. The method according to the claim 4, wherein a reload amount is received by the mobile receiving device from the external data terminal via the interface, and the monetary value is at least one of reloaded or loaded with the received reload amount.

6. The method according to the claim 1, wherein the programs include at least one of digital audio and video programs.

7. A communications system comprising:
at least one broadcast transmitter, which broadcasts at least one of programs and data unidirectionally via a broadcasting network; and
a receiving device, including:
    a broadcast receiver connected to the broadcasting network for receiving at least one of the unidirectionally broadcast programs and data using a first channel,
    an access control module designed in order that, decryption of a selected one of encrypted, unidirectionally broadcast, access-controlled programs and data is allowed when the access conditions data coincide with authorization data stored in the receiving device,
    a decryption module for decrypting the selected one of the access-controlled programs and data,
    a data memory in which a monetary value is stored,
    a costs recording module which determines costs for access to the selected one of the access-controlled programs and data based on received cost data for the selected one of the access-controlled programs and data;
    a credit control module which prevents access to the selected one of the access-controlled programs and data if the determined costs are greater than the stored monetary value, wherein
        the costs recording module is set up in such a way that the costs recording module deducts the costs for access to the selected one of the access-controlled programs and data from the stored monetary value, and wherein the costs recording module is set up in such a way that the costs recording module generates electronically signed billing records and stores the billing records in a data memory of the receiving device the billing records including at least one of the cost amounts and cost parameters for calculation of the cost amounts for the access to the selected one of the access-controlled programs and data as well as an identification of the vendor of the selected one of these access-controlled programs and data, and
    a communications module which transmits the generated billing records using a second channel, via a communications network, to a billing center which is set up in such a way that the billing center credits credit items to a vendor of the selected one of the plurality of access-controlled programs and data.

8. The communications system according to the claim 7, wherein at least one of the data memory in which the monetary value is stored, and the data memory, in which the billing records are stored, is integrated in a chip card which is removable from the mobile receiving device.

9. The communications system according to the claim 8, wherein the communications system includes at least one external data terminal outside the mobile receiving device, wherein the data terminal includes a card reading/writing device into which the chip card is insertable, and wherein the data terminal includes a reload module, which is set up in such a way that the reload module at least one of reloads or loads said monetary value with a reload value.

10. Communications system according to the claim 7, wherein the communications module is set up in such a way that the communications module receives a reload amount via the mobile telecommunication network, and the mobile receiving device includes a reload module that is set up in such a way that the reload module at least one of loads or reloads the monetary value with the received reload amount.

11. The communications system according to the claim 7, wherein the communications system includes at least one external data terminal outside the mobile receiving device, the mobile receiving device includes an interface for data exchange with the external data terminal and the mobile receiving module includes a reload module which is set up in such a way that the reload module receives a reload amount from the data terminal via the interface and at least one of reloads or loads the monetary value with the received reload value.

12. The communications system according to the claim 7, wherein the programs include at least one of digital audio and video programs.

13. A mobile receiving device comprising:
a broadcast receiver configured to receive at least one of programs and data, using a first channel, which are broadcast unidirectionally by a broadcast transmitter via a broadcasting network;
an access control module which is set up in a way that the access control module releases decryption of at least one of encrypted broadcast access-controlled programs and data upon received corresponding access conditions data coinciding with authorization data stored in the mobile receiving device;
a decryption module which decrypts at least one of access-controlled programs and data;
a data memory in which a monetary value is stored;
a costs recording module which is set up in such a way that the costs control module determines costs for access to at least one of the access-controlled programs and data based on received cost data for at least one of the access-controlled programs and data; and
a credit control module which prevents access to the selected one of the access-controlled programs and data upon the determined costs being greater than the stored monetary value wherein the costs recording module is set up in such a way that the costs recording module deducts the costs for access to the selected one of the access-controlled programs and data from the stored monetary value, wherein the costs recording module is set up in such a way that the costs recording module generates electronically signed billing records and stores them in a data memory of the receiving device, wherein the billing records include at least one of the cost amounts and cost parameters for calculation of the cost amounts for the access to the selected one of the access-controlled programs and data as well as an identification of a vendor of the selected one of these access-controlled programs and data, and a communications module which transmits the generated billing records to a billing center, using a second channel, via a communications network.

14. The mobile receiving device according to claim 13, wherein at least one of the data memory in which said monetary value is stored, and the data memory, in which the billing records are stored, is integrated in a chip card which is removable from the receiving device.

15. The mobile receiving device according to the claim 13, wherein the communications module is set up in such a way that the communications module receives a reload amount via the mobile telecommunications network, and wherein the mobile receiving device further comprises a reload module that at least one of reloads or loads the monetary value with the received reload amount.

16. The mobile receiving device according to the claim 13, wherein the receiving device further comprises, an interface for data exchange with an external data terminal outside the mobile receiving device;

a reload module which is set up in such a way that the reload module receives a reload amount from the data terminal via the interface and at least one of reloads or loads the monetary value with the received reload amount.

17. The mobile receiving device according to the claim 13, wherein the programs include at least one of digital audio and video programs.

18. The communication system of claim 7, wherein the at least one broadcast transmitter, the at least one receiving device and the billing center are separate, and no subscription is maintained linking the at least one broadcast transmitter and the at least one receiving device.

19. The method of claim 1, wherein the broadcast transmitter, the mobile receiving device and the billing center are separate, and no subscription is maintained linking the broadcast transmitter and the mobile receiving device.

20. The mobile receiving device of claim 13, wherein no subscription is maintained linking the broadcast transmitter and the mobile receiving device.

21. The method according to the claim 1, wherein generating billing records includes calculating costs amounts based on at least one of Start and End time, time length, and cost of time per unit of received program or data.

22. The communications system according to the claim 7, wherein the costs recording module generates billing records based on at least one of Start and End time, time length, and cost of time per unit of received program or data.

23. The mobile receiving device according to claim 13, wherein the costs recording module generates billing records based on at least one of Start and End time, time length, and cost of time per unit of received program or data.

* * * * *